United States Patent
Atterberry et al.

(10) Patent No.: US 10,323,586 B1
(45) Date of Patent: Jun. 18, 2019

(54) DUAL FUEL ENGINE CONTROL STRATEGY FOR LIMITING CYLINDER OVER-PRESSURIZATION

(71) Applicant: Caterpillar Inc., Peoria, IL (US)

(72) Inventors: Nathan Atterberry, Washington, IL (US); Matthew Jordan Engfehr, Dunlap, IL (US); Hua Xu, Dunlap, IL (US)

(73) Assignee: Caterpillar Inc., Deerfield, IL (US)

( * ) Notice: Subject to any disclaimer, the term of this patent is extended or adjusted under 35 U.S.C. 154(b) by 0 days.

(21) Appl. No.: 15/848,204

(22) Filed: Dec. 20, 2017

(51) Int. Cl.
*F02D 41/00* (2006.01)
*F02D 41/22* (2006.01)
*F02D 35/02* (2006.01)
*F02D 41/26* (2006.01)

(52) U.S. Cl.
CPC ....... *F02D 41/0027* (2013.01); *F02D 35/023* (2013.01); *F02D 41/222* (2013.01); *F02D 41/26* (2013.01); *F02D 2041/224* (2013.01)

(58) Field of Classification Search
CPC .. F02D 41/0027; F02D 35/023; F02D 41/222; F02D 2041/224; F02D 41/26
See application file for complete search history.

(56) References Cited

U.S. PATENT DOCUMENTS

| | | | |
|---|---|---|---|
| 9,200,611 B2 | 12/2015 | Taniguchi et al. | |
| 9,464,583 B2 | 10/2016 | Zur Loye et al. | |
| 9,593,623 B2 | 3/2017 | Lavertu et al. | |
| 2012/0085326 A1* | 4/2012 | Mo | F02D 19/061 123/526 |
| 2014/0136080 A1* | 5/2014 | Sivasubramanian | F02D 19/0623 701/103 |
| 2014/0373822 A1* | 12/2014 | Rosswurm | F02D 41/0027 123/676 |
| 2015/0176509 A1 | 6/2015 | Lavertu et al. | |
| 2016/0069287 A1 | 3/2016 | Lavertu et al. | |
| 2016/0305351 A1* | 10/2016 | Barta | F02D 41/14 |

* cited by examiner

*Primary Examiner* — Joseph J Dallo
(74) *Attorney, Agent, or Firm* — Jonathan F. Yates

(57) ABSTRACT

A dual fuel engine control system includes a pressure sensor, and an electronic control unit coupled with the pressure sensor and structured to receive cylinder pressure data indicative of cylinder over-pressurization, and to switch the system to a limited gas-to-liquid substitution mode based on the cylinder pressure data indicative of cylinder over-pressurization. The electronic control unit is further structured to return the system to a normal gas-to-liquid substitution mode, receive cylinder pressure data indicative of cylinder over-pressurization after returning the system to the normal gas-to-liquid substitution mode, and responsively output a gas substitution fault signal.

20 Claims, 3 Drawing Sheets

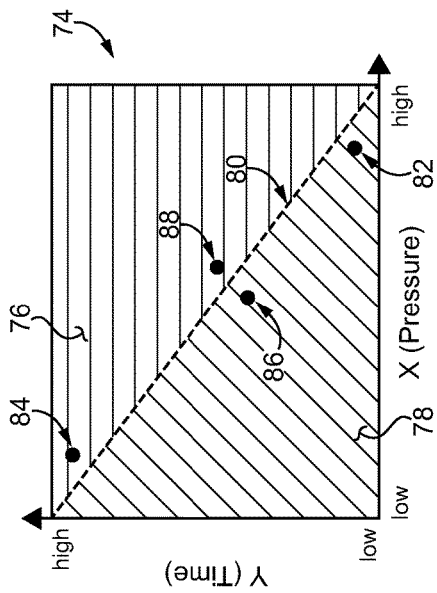
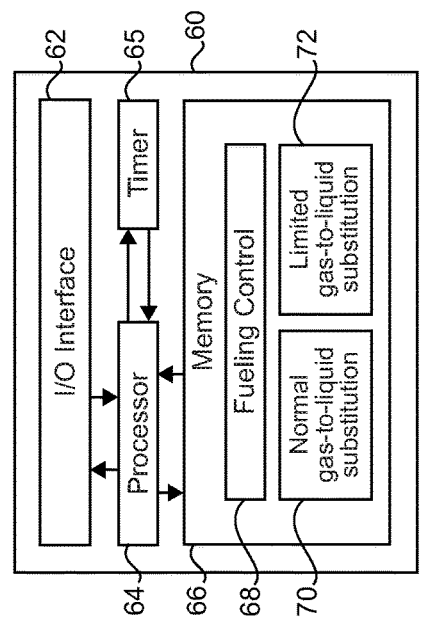
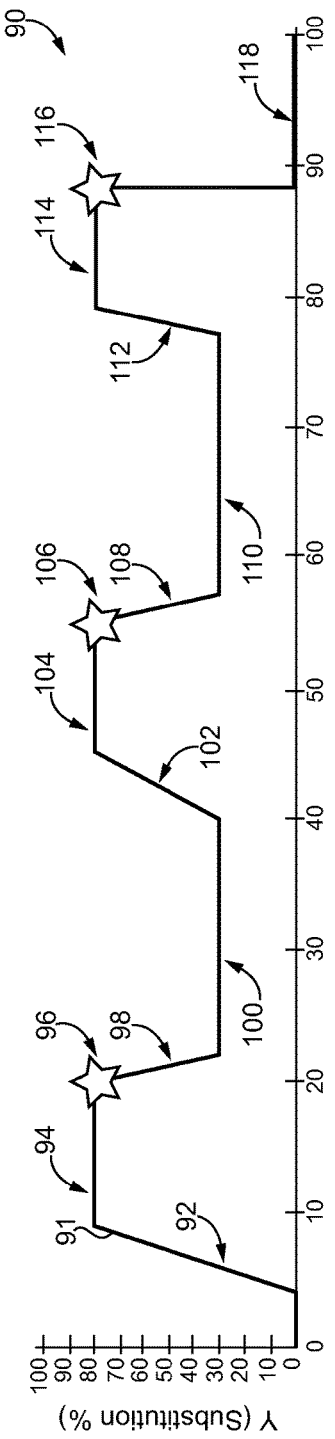

DUAL FUEL ENGINE CONTROL STRATEGY FOR LIMITING CYLINDER OVER-PRESSURIZATION

TECHNICAL FIELD

The present disclosure relates generally to a control strategy for a dual fuel engine system, and more particularly to switching the dual fuel engine system to a limited gas-to-liquid substitution mode where cylinder pressure data indicates cylinder over-pressurization.

BACKGROUND

Internal combustion engines are well known and widely used for propulsive power, electrical power generation, gas compression, liquid and gas transfer, and in various industrial applications. In a conventional four-cycle or two-cycle operating scheme, a mixture of fuel and air is combusted within an engine cycle to produce a rapid pressure rise and induce linear travel of a piston, ultimately rotating a crankshaft to provide torque for various purposes. Spark-ignited engines typically employ a liquid petroleum distillate fuel such as gasoline, or various gaseous fuels in the nature of natural gas, methane, propane, and various mixtures such as biogas, landfill gas, and mine gas. Compression-ignition engines typically utilize fuels such as diesel distillate fuel, biodiesel, and still other liquid fuels. In recent years, there has been significant interest in development of engines and operating strategies that are flexible with regard to fuel utilization. Fuel prices can be fairly dynamic and, moreover, certain fuels that have realized relatively increased abundance in recent years, such as natural gas, can have desirable combustion or emissions properties which are sought to be exploited.

One type of engine design that allows for operation with different fuel types combines both a diesel distillate fuel and natural gas. Diesel alone is relatively easy to compression ignite, but can produce undesired emissions. Where natural gas is used as a fuel in a diesel engine, without modification the mixture of natural gas and air can fail to ignite, knock, or have combustion stability problems. Various strategies have been developed that predominantly burn natural gas while using a relatively smaller amount of diesel fuel as a so-called pilot fuel. The diesel pilot fuel can ignite to in turn ignite the natural gas, offering relative predictability and reliability in the timing and manner of ignition, and otherwise combining certain advantages of both fuel types. One example of such an engine is known from U.S. Pat. No. 6,032,617 to Willi et al.

The term "substitution" or "substitution ratio" is commonly used to describe the relative contributions of diesel fuel and gaseous fuel in a dual fuel engine at any one time, and can be understood generally as the extent to which gaseous fuel is substituted for what would otherwise be diesel fuel in a single fuel liquid fuel engine. In certain dual fuel engines, particularly at relatively high levels of substitution, combustion events can occur that drive cylinder pressures above a maximum limit, typically based upon the capability or tolerance of the hardware to withstand pressure magnitude and pressure impulses. These relatively extreme pressure events can occur for a variety of reasons, including oil droplets present in the combustion chamber, variation in the composition of the gaseous fuel or gaseous fuel blend, under-delivery or over-delivery of gaseous fuel, temperature variation, or still other factors.

SUMMARY OF THE INVENTION

In one aspect, a dual fuel engine control system includes a pressure sensor structured for positioning in fluid communication with a combustion cylinder in a dual fuel engine system, and an electronic control unit. The electronic control unit is structured to receive cylinder pressure data from the pressure sensor, and to vary gas-to-liquid fuel substitution in the dual fuel engine system based on the cylinder pressure data. The electronic control unit is further structured to receive cylinder pressure data indicative of cylinder over-pressurization in an earlier engine cycle during operation of the dual fuel engine system in a normal gas-to-liquid substitution mode. The electronic control unit is further structured to switch the dual fuel engine system to operation in a limited gas-to-liquid substitution mode based on the cylinder pressure data indicative of cylinder over-pressurization in an earlier engine cycle. The electronic control unit is further structured to return the dual fuel engine system to operation in the normal gas-to-liquid substitution mode, and to receive cylinder pressure data indicative of cylinder over-pressurization in a later engine cycle after returning the dual fuel engine system to operation in the normal gas-to-liquid substitution mode. The electronic control unit is still further structured to output a gas substitution fault signal based on the data indicative of cylinder over-pressurization in a later engine cycle.

In another aspect, a method of operating a dual fuel engine system includes receiving data indicative of cylinder over-pressurization in an earlier engine cycle during operation of the dual fuel engine system in a normal gas-to-liquid substitution mode, and switching the dual fuel engine system to operation in a limited gas-to-liquid substitution mode in response to the data indicative of cylinder over-pressurization in an earlier engine cycle. The method further includes returning the dual fuel engine system to operation in the normal gas-to-liquid substitution mode, and receiving data indicative of cylinder over-pressurization in a later engine cycle after returning the dual fuel engine system to operation in the normal gas-to-liquid substitution mode. The method still further includes outputting a gas substitution fault signal in response to the data indicative of cylinder over-pressurization in a later engine cycle.

In still another aspect, a dual fuel engine system includes an engine having an engine housing with a plurality of combustion cylinders formed therein, and a dual fuel system coupled with the engine. The dual fuel system includes a plurality of liquid fuel admission valves for conveying a liquid fuel into the plurality of combustion cylinders, and at least one gaseous fuel admission valve for conveying a gaseous fuel into the plurality of combustion cylinders. The dual fuel engine system further includes a dual fuel control system having a plurality of pressure sensors in fluid communication with the plurality of combustion cylinders, and an electronic control unit. The electronic control unit is structured to receive cylinder pressure data indicative of cylinder over-pressurization in an earlier engine cycle during operation of the dual fuel engine system in a normal gas-to-liquid substitution mode. The electronic control unit is further structured to switch the dual fuel engine system to operation in a limited gas-to-liquid substitution mode based on the cylinder pressure data indicative of cylinder over-pressurization in an earlier engine cycle. The electronic control unit is further structured to return the dual fuel engine system to operation in the normal gas-to-liquid substitution mode, and to receive cylinder pressure data indicative of cylinder over-pressurization in a later engine cycle after returning the dual fuel engine system to operation in the normal gas-to-liquid substitution mode. The electronic control unit is still further structured to output a gas substitution fault signal in response to the cylinder pressure data indicative of cylinder over-pressurization in a later engine cycle.

BRIEF DESCRIPTION OF THE DRAWINGS

FIG. 2 is a block diagram of a control unit, according to one embodiment;

FIG. 3 is a concept diagram of cylinder pressure states, according to one embodiment;

FIG. 4 is a graph of dual fuel engine system operating states over time, according to one embodiment.

DETAILED DESCRIPTION

Figure 1:
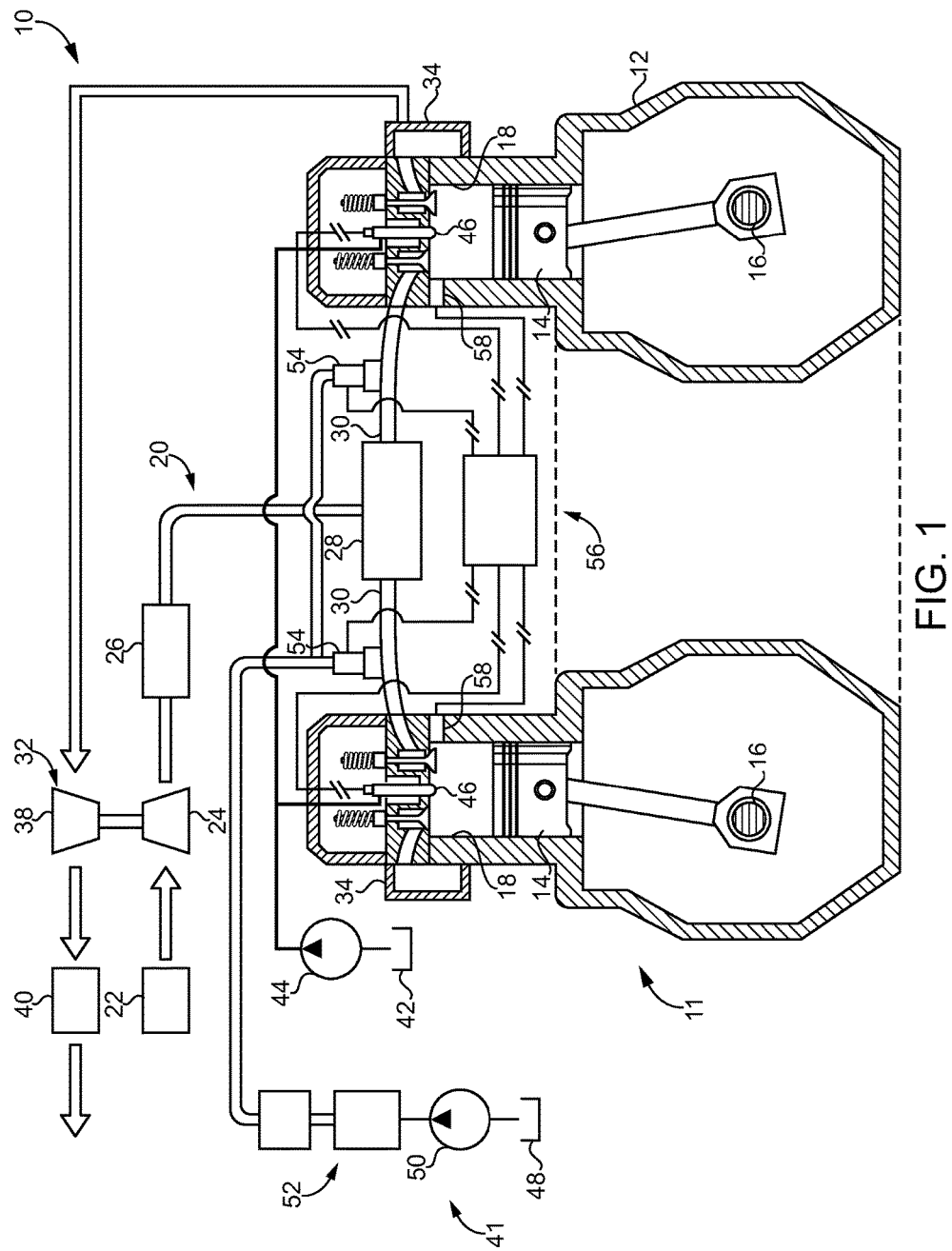
FIG. 1 is a partially sectioned side diagrammatic view of a dual fuel engine system, according to one embodiment.

Referring to FIG. 1, there is shown a dual fuel engine system 10 according to one embodiment, and including an internal combustion dual fuel engine 11 having an engine housing 12 with a plurality of pistons 14 positioned at least partially within a plurality of combustion cylinders 18 formed in engine housing 12. Dual fuel engine system 10 (hereinafter "engine system 10") also includes a crankshaft 16 coupled with pistons 14 in a generally conventional manner. In a typical embodiment, internal combustion engine 11 (hereinafter "engine 11") is a multi-cylinder engine with cylinders 18 in an in-line configuration, a V-configuration, or any other suitable configuration. Pistons 14 are movable within engine housing 12 to compress a mixture of air and fuel in corresponding combustion cylinders 18 to an autoignition threshold, with a liquid fuel such as diesel distillate liquid fuel serving as a pilot fuel igniting a main charge of a gaseous fuel such as natural gas, as further discussed herein. As will be further apparent from the following description, engine system 10 is uniquely configured to vary and/or suspend substitution of gaseous fuel for liquid fuel (hereinafter "gas-to-liquid substitution") in a manner that protects engine system 10 from over-pressurization and consequent hardware damage or performance degradation.

Engine system 10 further includes an air system 20 having an air inlet 22 structured to feed intake air for combustion to a compressor 24 in a turbocharger 32. Air compressed by way of compressor 24 can be fed through an aftercooler 26, and thenceforth to an intake manifold 28. A plurality of intake runners 30 feed air from intake manifold 28 to individual cylinders 18. In one implementation, a gaseous fuel for combustion is delivered into the flow of incoming intake air downstream of aftercooler 26 and into intake manifold 28 or intake runners 30. In another implementation, gaseous fuel could be delivered into the flow of incoming intake air upstream of compressor 24, for instance, and typically by way of a gaseous fuel delivery valve (not shown) positioned fluidly between air inlet 22 and compressor 24. In still another embodiment, gaseous fuel is directly injected by way of gaseous fuel injectors into combustion cylinders 18. An exhaust manifold 34, that includes or is fluidly connected with exhaust runners 36 is in fluid communication with combustion cylinders 18 and feeds exhaust gases to a turbine 38 of turbocharger 32, with the exhaust subsequently conveyed to an exhaust outlet or tailpipe 40, possibly first passing through one or more exhaust aftertreatment devices (not shown) or potentially even a second turbine stage of a second turbocharger.

Engine system 10 further includes a dual fuel system 41 having a first fuel supply 42 that is a liquid fuel supply, and one or more liquid fuel pumps 44 structured to convey and pressurize liquid fuel for delivery to a plurality of liquid fuel admission valves 46. Liquid fuel admission valves 46 can include liquid fuel injectors each positioned partially within one of combustion cylinders 18 and structured to directly inject liquid fuel therein. Alternatives such as port-injected designs are also contemplated. Moreover, pressurization of fuel to injection pressures could occur within liquid fuel admission valves 46 by way of fuel pressurization plungers driven by a cam, for instance.

Fuel system 41 also includes a second fuel supply 48 that is a gaseous fuel supply structured to contain a gaseous fuel in a compressed gaseous form or a cryogenically stored liquid form. A gaseous fuel pump 50 can pump the gaseous fuel in the subject liquid form or gaseous form to vaporization and pressurization equipment 52 of generally known design. From vaporization and pressurization equipment 52 the gaseous fuel can be fed to at least one gaseous fuel admission valve 54. As noted above, a plurality of gaseous fuel delivery points by way of a plurality of gaseous fuel admission valves 54 is contemplated, however, the present disclosure is not thereby limited and delivery of gaseous fuel at a single point such as to intake manifold 28 or upstream of intake manifold 28 could be employed.

Engine system 10 further includes a dual fuel engine control system 56 (hereinafter "control system 56") having one or more pressure sensors 58 structured for positioning in fluid communication with combustion cylinders 18 in engine system 10. In the illustrated embodiment, each pressure sensor 58 is an in-cylinder pressure sensor which will be understood to include a movable or deformable element (not shown) that is responsive to fluid pressure in the corresponding combustion cylinder 18. Pressure sensors 58, hereinafter described in but not limited to the singular, produces an electrical output such as a voltage or a current that provides data indicative of cylinder pressure in real time. Control system 56 also includes an electronic control unit 60 structured to receive cylinder pressure data from pressure sensor 58, and to vary gas-to-liquid fuel substitution in engine system 10 based on the cylinder pressure data, the significance of which will be further apparent from the following description.

Referring also now to FIG. 2, there is shown a block diagram of electronic control unit 60 illustrating example elements thereof. Electronic control unit 60 can include an input/output or I/O interface 62, and a processor 64. Processor 64 can include any suitable computerized data processing device such as a microprocessor, or a microcontroller. Processor 64 may be coupled with an electronic timer 65, resident on electronic control unit 60 for example, and with a computer readable memory 66. Computer readable memory 66 can include computer executable instructions recorded thereon for monitoring and/or controlling various aspects of operation of engine system 10, including fueling control software 68, a normal gas-to-liquid substitution map 70, and a limited gas-to-liquid substitution map 72. Normal gas-to-liquid substitution map 70 (hereinafter "fueling map 70") might store fueling control commands, fueling amounts, or other fueling information according to a first map coordinate, engine speed information according to a second coordinate, and indicated mean effective pressure (IMEP) according to a third coordinate. Limited gas-to-liquid substitution map 72 (hereinafter "fueling map 72") may be analogously configured. Fueling control software 68 can read fueling control values, such as for commanding a fueling amount of at least one of gaseous fuel and liquid fuel, from fueling map 70 when gas-to-liquid substitution is being employed in normal operation, and can read fueling control values, from fueling map 72 from a second mode, as further discussed herein.

Electronic control unit 60 is further structured to receive cylinder pressure data indicative of cylinder over-pressurization in an earlier engine cycle during operation of engine system 10 in a normal gas-to-liquid substitution mode. As noted above, fueling control values in the normal gas-to-liquid substitution mode may be determined according to fueling map 70. Electronic control unit 60 is also structured to switch engine system 10 to operation in a limited gas-to-liquid substitution mode based on the cylinder pressure data indicative of cylinder over-pressurization in an earlier engine cycle. The term earlier is used herein in a relative sense in comparison to engine cycles further discussed and occurring later in time than an earlier engine cycle. An earlier engine cycle could precede a later engine cycle by a few minutes, several hours, or potentially several days. A middle engine cycle discussed in the present disclosure occurs in time between an earlier engine cycle and a later engine cycle, and an initial engine cycle precedes an earlier engine cycle. No particular separation in time amongst engine cycles is intended herein.

Electronic control unit 60 may further be structured to return engine system 10 to operation in the normal gas-to-liquid substitution mode, and to receive cylinder pressure data indicative of cylinder over-pressurization in a later engine cycle after returning engine system 10 to operation in the normal gas-to-liquid substitution mode. In an implementation, electronic control unit 60 can be further structured to start timer 65 based on the cylinder pressure data indicative of cylinder over-pressurization in an earlier engine cycle, and may further be structured to return engine system 10 to operation in the normal gas-to-liquid substitution mode based on expiration of timer 65. These procedures can be thought of as receiving an indication of detected or likely cylinder over-pressurization, during gaseous fuel substitution at a relatively higher level, and responsively lowering gaseous fuel substitution for a period of time determined by timer 65, if circumstances in the interim do not justify disabling gaseous fuel substitution or taking some other action. It should be appreciated that during operation in the normal gas-to-liquid substitution mode the relative extent of gaseous fuel substitution may be based on a first criterion, such as an ignitability criterion, for example, meaning that gaseous fuel could be supplied without limitation, subject to usual engine speed and engine load demands, so long as a sufficient amount of diesel fuel is delivered to provide robust and reliable pilot ignition. The specific amount of diesel fuel needed in such circumstances could be empirically determined. Additionally or alternatively, the relative extent to which gaseous fuel is substituted for diesel fuel could be user-specified based on factors such as gaseous fuel availability, price, or engine performance parameters that are desired. In the limited gas-to-liquid substitution mode the relative extent of gaseous fuel substitution could be based on a second criterion, such as a criterion that is a minimum deliverable amount of gaseous fuel, for example. Providing a minimum deliverable amount of gaseous fuel might be desirable to maintain some minimum level of operation of the gaseous fuel side of fuel system 41. Alternatively, in the limited gas-to-liquid substitution mode, the relative extent of gaseous fuel substitution might be 0. In other words, the limited gas-to-liquid substitution mode could include a diesel-only mode in some embodiments. Moreover, it should also be appreciated that while electronic control unit 60 is structured to determine fueling commands by way of a stored first map such as fueling map 70 in the normal gas-to-liquid substitution mode, and by way of a stored second map such as fueling map 72 in the limited gas-to-liquid substitution mode, in other instances a single multi-coordinate map might be used, or a number of fueling maps greater than two might be used, or another fueling control strategy altogether.

As noted above, engine system 10 can be operated in the limited gas-to-liquid substitution mode for a period of time such as a period of time determined by way of timer 65. Reasons for cylinder over-pressurization could include fuel droplets in a cylinder, variation in a composition of gaseous fuel or a gaseous fuel blend, or variations in fuel delivery, to name a few examples. These and other factors causing cylinder over-pressurization could be resolved by enabling engine system 10 to operate in the limited gas-to-liquid substitution mode whilst simultaneously or eliminating the risk of cylinder over-pressurization that could lead to hardware damage or performance degradation. Accordingly, once switched to operation in the limited gas-to-liquid substitution mode, engine system 10 may be thought of as having an opportunity for self-correction. As noted, if, during this period of time for potential self-correction, another cylinder over-pressurization event is detected, it might be determined that engine system 10 should be shut down or perhaps operated in a so-called limp home mode, for instance. Occurrence of cylinder over-pressurization in a limited gas-to-liquid substitution mode could be indicative of a hardware problem or a controls problem, such as excessive intake manifold temperature, improper valve timing, or various other problems. In any event, once the opportunity for self-correction has ended, an attempt may be made to return engine system 10 to operation in the normal gas-to-liquid substitution mode. Cylinder pressure data indicating cylinder over-pressurization in the later engine cycle as discussed herein may indicate that self-correction has not and/or is not likely to occur. Based on the cylinder pressure data indicative of cylinder over-pressurization in a later engine cycle, electronic control unit 60 can output a gas substitution fault signal. The fault signal could be logged as a designated error code in memory 66, for instance, and control system 56 can take further action in response to the fault detection to ensure continued availability of operation of engine system 10. For instance, electronic control unit 60 may be further structured to switch engine system 10 to operation in a liquid-only mode based on the gas substitution fault signal. A liquid-only mode could include the limited gas-to-liquid substitution enabled by fueling map 72, where the substitution limit is 0, or another fueling map that is a liquid-fueling-only map could be used, for example. It is further contemplated that rather than merely an earlier engine cycle and a later engine cycle where cylinder over-pressurization is detected, in some instances a third occurrence of cylinder over-pressurization and two opportunities for self-correction might be required before a fault state is triggered. To this end, electronic control unit 60 may be further structured to receive cylinder pressure data indicative of cylinder over-pressurization in an initial engine cycle preceding the earlier engine cycle during operation of engine system 10 in the normal gas-to-liquid substitution mode.

Referring now also to FIG. 3, it will be recalled that pressure sensor 58 produces cylinder pressure data potentially continuously, but typically at least over the course of a majority of a compression stroke and an ignition stroke in a given engine cycle. Cylinder pressure data indicative of over-pressurization in the later engine cycle, and potentially also in the earlier engine cycle and where considered the initial engine cycle, can include cylinder pressure magnitude data and also cylinder pressure timing data. In this way, electronic control unit 60 can determine not only a peak cylinder pressure but also a time duration of occurrence of peak cylinder pressure, or cylinder pressure above some threshold. A specific threshold in this regard could be determined empirically for each engine, and will typically be based upon a hardware limit. In FIG. 3, a fault-triggered or over-pressurization zone 76 is shown, and a no-fault or normal zone 78, in a concept diagram 74 where pressure is shown on the X-axis and time is shown on the Y-axis. In diagram 74 a threshold 80 separates zone 76 from zone 78, with cylinder pressure events shown at 82 and 86 within zone 78. Cylinder pressure events 84 and 88 are shown in zone 76. It can be appreciated that a relatively high pressure magnitude but a relatively short time duration is associated with pressure event 82, whereas a relatively long time duration and relatively low pressure magnitude is associated with pressure event 84. Event 82 is within zone 78, where electronic control unit 60 would likely not output a gas substitution fault signal, whereas event 84 is within zone 76 where electronic control unit 60 would likely output a gas substitution fault signal. Event 86 and event 88 can both be seen to be associated with a medium cylinder pressure magnitude and a medium cylinder pressure duration, but are nevertheless upon opposite sides of threshold 80. From FIG. 3 and the accompanying description it will be understood that electronic control unit 60 can be structured to compare cylinder pressure magnitude and cylinder pressure timing to a threshold determined according to a magnitude-duration sliding scale. Another way to understand the principles set forth in FIG. 3 is that a relatively high pressure and relatively short duration need not trigger a fault, whereas a relatively lower pressure but a relatively longer duration might trigger a fault. Individual dual fuel engine systems or classes of dual fuel engine systems can be calibrated to determine cylinder pressure timings, and cylinder pressure magnitudes, that define the magnitude-duration sliding scale according to sensitivity to over-pressurization, operational characteristics, and other factors.

INDUSTRIAL APPLICABILITY

Referring to the drawings generally, but in particular now to FIG. 4, there is shown a graph 90 illustrating engine system operation according to one embodiment of the present disclosure, with time (potentially in hours) shown on the X-axis and gas-to-liquid substitution percent shown on the Y-axis. A trace is shown at 91 and illustrates the general patterns of substitution variation that might be observed where engine system 10 is transitioned through different modes with attempted substitution of gaseous fuel for liquid fuel, and eventual reversion to liquid-only mode. In a period 92 gaseous fuel substitution is increased up to a level shown, for example, that is at about 80 percent in gas-to-liquid substitution, and where engine system 10 is then operated at that substitution for a period 94. A cylinder over-pressurization event is detected at 96, and thereafter substitution is reduced in a period 98 as engine system 10 is switched to the limited gas-to-liquid substitution mode, in which it is operated for a period 100. Period 100 represents an opportunity for self-correction as discussed herein. In a period 102 gas substitution is again attempted and the substitution percent is increased from about 30 percent in period 100 to about 80 percent in a period 104. Another over-pressurization event is shown at 106, and substitution is again reduced in a period 108, with engine system 10 then operated in the limited gas-to-liquid substitution mode in a period 110. In a period 112 substitution is again increased and engine system 10 operated in the normal gas-to-liquid substitution mode in a period 114. At 116 another cylinder over-pressurization event is detected. Cylinder over-pressurization event 116 can include a third cylinder over-pressurization event, for example, that triggers outputting the gas substitution fault signal, and subsequent operation for a period 118 in liquid-only mode. It will be appreciated that over-pressurization event 96 could be detected in an initial engine cycle as contemplated herein, over-pressurization event 106 detected in an earlier engine cycle or a middle engine cycle, and over-pressurization event 116 detected in a later engine cycle. As also noted, the periods of time such as period 100 and period 110 where engine system 10 is allowed opportunity for self-correction could be determined individually for a dual fuel engine, or a class of dual fuel engines.

Figure 5:
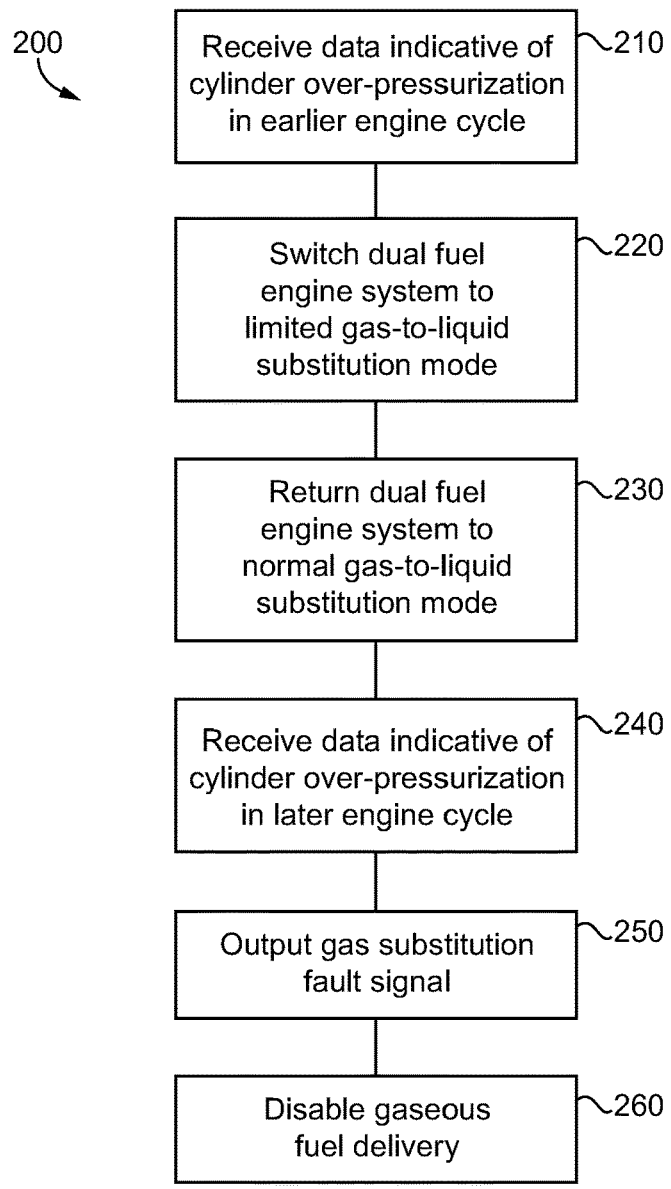
FIG. 5 is a flowchart illustrating example control logic flow, according to one embodiment.

Turning now to FIG. 5, there is shown a flowchart 200 illustrating example methodology and control logic flow. At a block 210 electronic control unit 60 receives data from pressure sensor 58 indicative of cylinder over-pressurization in an earlier engine cycle. From block 210, the logic can advance to block 220 to switch engine system 10 to limited gas-to-liquid substitution mode. From block 220, the logic can advance to a block 230 to return engine system 10 to the normal gas-to-liquid substitution mode. From block 230, the logic can advance to block 240 to receive data indicative of cylinder over-pressurization in a later engine cycle. From block 240 the logic can advance to block 260 to output the gas substitution fault signal, and to block 270 to disable gaseous fuel delivery or otherwise operate engine system 10 in the liquid-only mode. It will be appreciated that the illustration of FIG. 5 is exemplary only. Embodiments are contemplated where 2, 3, 4, 5, or still another number of cylinder over-pressurization events will occur prior to a fault condition being determined. It should also be appreciated that electronic control unit 60 might also receive data indicative of cylinder over-pressurization in a middle engine cycle, during operation of engine system 10 in the limited gas-to-liquid substitution mode. This would correspond, for example, to data indicative of cylinder over-pressurization being received during period 100 or period 110 in the FIG. 4 illustration. Electronic control unit 60 could output a hardware-faulted signal based on the data indicative of cylinder over-pressurization in the middle engine cycle to enable logging an error code, shutting down engine system 10, initiating a limp-home mode, or taking still another action.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A dual fuel engine control system comprising:
a pressure sensor structured for positioning in fluid communication with a combustion cylinder in a dual fuel engine system;
an electronic control unit structured to receive cylinder pressure data from the pressure sensor, and to vary gas-to-liquid fuel substitution in the dual fuel engine system based on the cylinder pressure data;
the electronic control unit being further structured to:
receive cylinder pressure data indicative of cylinder over-pressurization in an earlier engine cycle during operation of the dual fuel engine system in a normal gas-to-liquid substitution mode;
switch the dual fuel engine system to operation in a limited gas-to-liquid substitution mode based on the cylinder pressure data indicative of cylinder over-pressurization in an earlier engine cycle;
return the dual fuel engine system to operation in the normal gas-to-liquid substitution mode;
receive cylinder pressure data indicative of cylinder over-pressurization in a later engine cycle after returning the dual fuel engine system to operation in the normal gas-to-liquid substitution mode; and
output a gas substitution fault signal based on the cylinder pressure data indicative of cylinder over-pressurization in a later engine cycle and on a time between the cylinder over-pressurization in the earlier engine cycle and the cylinder over-pressurization in the later engine cycle.

2. The dual fuel engine control system of claim 1 wherein the electronic control unit is further structured to start a timer based on the cylinder pressure data indicative of cylinder over-pressurization in an earlier engine cycle.

3. The dual fuel engine control system of claim 2 wherein the electronic control unit is further structured to return the dual fuel engine system to operation in the normal gas-to-liquid substitution mode based on expiration of the timer.

4. The dual fuel engine control system of claim 1 wherein the cylinder pressure data indicative of over-pressurization in the earlier engine cycle and the cylinder pressure data indicative of over-pressurization in the later engine cycle includes cylinder pressure magnitude data and cylinder pressure timing data.

5. The dual fuel engine control system of claim 4 wherein the electronic control unit is further structured to compare cylinder pressure magnitude and cylinder pressure timing to a threshold determined according to a magnitude-duration sliding scale.

6. The dual fuel engine control system of claim 1 wherein the electronic control unit is further structured to receive cylinder pressure data indicative of cylinder over-pressurization in an initial engine cycle preceding the earlier engine cycle during operation of the dual fuel engine system in the normal gas-to-liquid substitution mode.

7. The dual fuel engine control system of claim 6 wherein the electronic control unit is further structured to switch the dual fuel engine system to operation in a liquid-only mode based on the gas substitution fault signal.

8. The dual fuel engine control system of claim 1 wherein the electronic control unit is further structured to determine fueling commands by way of a stored first map in the normal gas-to-liquid substitution mode, and by way of a stored second map in the limited gas-to-liquid substitution mode.

9. A method of operating a dual fuel engine system comprising:
receiving data indicative of cylinder over-pressurization in an earlier engine cycle during operation of the dual fuel engine system in a normal gas-to-liquid substitution mode;
switching the dual fuel engine system to operation in a limited gas-to-liquid substitution mode in response to the data indicative of cylinder over-pressurization in an earlier engine cycle;
returning the dual fuel engine system to operation in the normal gas-to-liquid substitution mode;
receiving data indicative of cylinder over-pressurization in a later engine cycle after returning the dual fuel engine system to operation in the normal gas-to-liquid substitution mode;
counting a number of cylinder over-pressurizations in a monitoring period that includes the earlier engine cycle and the later engine cycle; and
outputting a gas substitution fault signal in response to the data indicative of cylinder over-pressurization in a later engine cycle and the number of cylinder over-pressurizations in the monitoring period.

10. The method of claim 9 wherein the receiving of data indicative of cylinder over-pressurization in an earlier engine cycle includes receiving data produced by an in-cylinder pressure sensor, and further comprising disabling gaseous fuel delivery to the dual fuel engine in response to the gas substitution fault signal.

11. The method of claim 10 wherein the receiving of data indicative of cylinder over-pressurization in an earlier engine cycle further includes receiving cylinder pressure magnitude data and cylinder pressure duration data.

12. The method of claim 11 further comprising comparing the cylinder pressure magnitude and cylinder pressure duration to a threshold determined according to a magnitude-duration sliding scale.

13. The method of claim 10 wherein the switching of the dual fuel system to operation in a limited gas-to-liquid substitution mode includes switching determination of fueling control commands by way of a first map to determination of fueling control commands by way of a second map.

14. The method of claim 9 further comprising starting a timer based on the data indicative of cylinder over-pressurization in the earlier engine cycle.

15. The method of claim 14 wherein the returning of the dual fuel system to operation in the normal gas-to-liquid substitution mode further includes returning the dual fuel system to operation in the normal gas-to-liquid substitution mode based on expiration of the timer.

16. The method of claim 9 further comprising receiving data indicative of cylinder over-pressurization in a middle engine cycle during operation of the dual fuel system in the limited gas-to-liquid substitution mode, and outputting a hardware-faulted signal based on the data indicative of cylinder over-pressurization in the middle engine cycle.

17. A dual fuel engine system comprising:
an engine having an engine housing with a plurality of combustion cylinders formed therein;
a dual fuel system coupled with the engine and having a plurality of liquid fuel admission valves for conveying a liquid fuel into the plurality of combustion cylinders, and at least one gaseous fuel admission valve for conveying a gaseous fuel into the plurality of combustion cylinders;

a dual fuel control system including a plurality of pressure sensors in fluid communication with the plurality of combustion cylinders, and an electronic control unit;

the electronic control unit being structured to:
receive cylinder pressure data indicative of cylinder over-pressurization in an earlier engine cycle during operation of the dual fuel engine system in a normal gas-to-liquid substitution mode;
switch the dual fuel engine system to operation in a limited gas-to-liquid substitution mode based on the cylinder pressure data indicative of cylinder over-pressurization in an earlier engine cycle;
return the dual fuel engine system to operation in the normal gas-to-liquid substitution mode;
receive cylinder pressure data indicative of cylinder over-pressurization in a later engine cycle after returning the dual fuel engine system to operation in the normal gas-to-liquid substitution mode; and
output a gas substitution fault signal in response to the cylinder pressure data indicative of cylinder over-pressurization in a later engine cycle and on a time between the cylinder over-pressurization in the earlier engine cycle and the cylinder over-pressurization in the later engine cycle.

18. The dual fuel engine system of claim 17 wherein the electronic control unit is further structured to disable gaseous fuel delivery to the dual fuel engine in response to the gas substitution fault signal.

19. The dual fuel engine system of claim 18 wherein the electronic control unit includes a computer readable memory storing a first map for operating the dual fuel engine system in the normal gas-to-liquid substitution mode, and a second map for operating the dual fuel engine system in the limited gas-to-liquid substitution mode.

20. The dual fuel engine system of claim 17 wherein the electronic control unit is further structured to:
start a timer based on the cylinder pressure data indicative of cylinder over pressurization in an earlier engine cycle; and
return the dual fuel engine system to operation in the normal gas-to-liquid substitution mode based on expiration of the timer.

* * * * *